US010006801B2

(12) United States Patent
Hagerott et al.

(10) Patent No.: US 10,006,801 B2
(45) Date of Patent: Jun. 26, 2018

(54) AIRCRAFT WEIGHT ESTIMATION

(71) Applicant: Cessna Aircraft Company, Wichita, KS (US)

(72) Inventors: Steven G. Hagerott, Wichita, KS (US); Russell Peters, Colorado Springs, CO (US)

(73) Assignee: Textron Innovations, Inc., Providence, RI (US)

( * ) Notice: Subject to any disclaimer, the term of this patent is extended or adjusted under 35 U.S.C. 154(b) by 9 days.

(21) Appl. No.: 15/407,903

(22) Filed: Jan. 17, 2017

(65) Prior Publication Data

US 2017/0284856 A1 Oct. 5, 2017

Related U.S. Application Data

(63) Continuation-in-part of application No. 15/087,026, filed on Mar. 31, 2016.

(51) Int. Cl.
| | |
|---|---|
| *G01P 5/16* | (2006.01) |
| *G01G 19/07* | (2006.01) |
| *G01P 13/02* | (2006.01) |
| *G01P 15/00* | (2006.01) |
| *B64F 5/60* | (2017.01) |

(52) U.S. Cl.
CPC .............. *G01G 19/07* (2013.01); *B64F 5/60* (2017.01); *G01P 13/025* (2013.01); *G01P 15/00* (2013.01)

(58) Field of Classification Search
CPC .......................................................... G01P 5/16
USPC ........................................................... 700/144
See application file for complete search history.

(56) References Cited

U.S. PATENT DOCUMENTS

| | | | |
|---|---|---|---|
| 5,297,052 A | 3/1994 | McIntyre et al. | |
| 6,273,370 B1 | 8/2001 | Colgren | |
| 6,466,888 B1 | 10/2002 | McCool et al. | |
| 6,561,020 B2 | 5/2003 | Glenney | |
| 6,722,610 B1 * | 4/2004 | Rawdon .................. | B64C 25/00 244/103 |
| 8,412,389 B2 | 4/2013 | Tessier | |
| 8,914,164 B1 | 12/2014 | Nathan et al. | |
| 2007/0239326 A1 | 10/2007 | Johnson et al. | |

* cited by examiner

*Primary Examiner* — Harry W Byrne
(74) *Attorney, Agent, or Firm* — Erise IP, P.A.

(57) ABSTRACT

In an embodiment, a method for aircraft weight estimation is provided that includes determining a weight signal based on a dynamic pressure signal, a calibrated angle of attack signal, a lift coefficient signal, a load factor signal, and a wing surface area. In another embodiment, a method to estimate aircraft weight is provided that includes determining a weight based on historical flight data relating horizontal control surface position to dynamic pressure. In another embodiment, a system for continuously estimating aircraft weight during flight is provided that includes a pitot-static subsystem, an angle of attack indicator, an accelerometer, a controller configured to provide a weight signal, and a signal filter for filtering the weight signal to determine a stable aircraft weight.

17 Claims, 5 Drawing Sheets

AIRCRAFT WEIGHT ESTIMATION

RELATED APPLICATIONS

This application is a continuation-in-part of U.S. application Ser. No. 15/087,026, entitled "Airspeed Determination for Aircraft" and filed Mar. 31, 2016. The aforementioned application is incorporated by reference in its entirety.

BACKGROUND

Embodiments of this disclosure relate generally to computing information for aircraft, and more specifically to estimating aircraft weight based on aircraft parameters measured during flight.

SUMMARY

In an embodiment, a method for aircraft weight estimation is provided. The method includes providing a dynamic pressure signal from a pitot-static subsystem; determining a calibrated angle of attack signal from an angle of attack indicator; determining a lift coefficient signal based on the calibrated angle of attack signal and a Mach number; providing a load factor signal from an accelerometer; and, determining a weight signal based on the dynamic pressure signal, the calibrated angle of attack signal, the lift coefficient signal, the load factor signal, and a wing surface area.

In another embodiment, a method for aircraft weight estimation is provided. The method includes measuring a horizontal control surface position with a sensor; providing a dynamic pressure from a pitot-static subsystem; determining a weight using historical flight data relating the horizontal control surface position to the dynamic pressure based on aircraft weight; and, repeating continuously during flight the steps of measuring the horizontal control surface position, providing the dynamic pressure, and determining the weight to provide a weight signal.

In yet another embodiment, a system for continuously estimating aircraft weight during flight is provided. The system includes a pitot-static subsystem for providing a dynamic pressure signal; an angle of attack indicator for providing a calibrated angle of attack signal; an accelerometer for providing a load factor signal; a controller configured to provide a weight signal based on an initial weight, the dynamic pressure signal, the calibrated angle of attack signal, and the load factor signal; and, a signal filter for filtering the weight signal to determine a stable aircraft weight.

DETAILED DESCRIPTION

Figure 1:
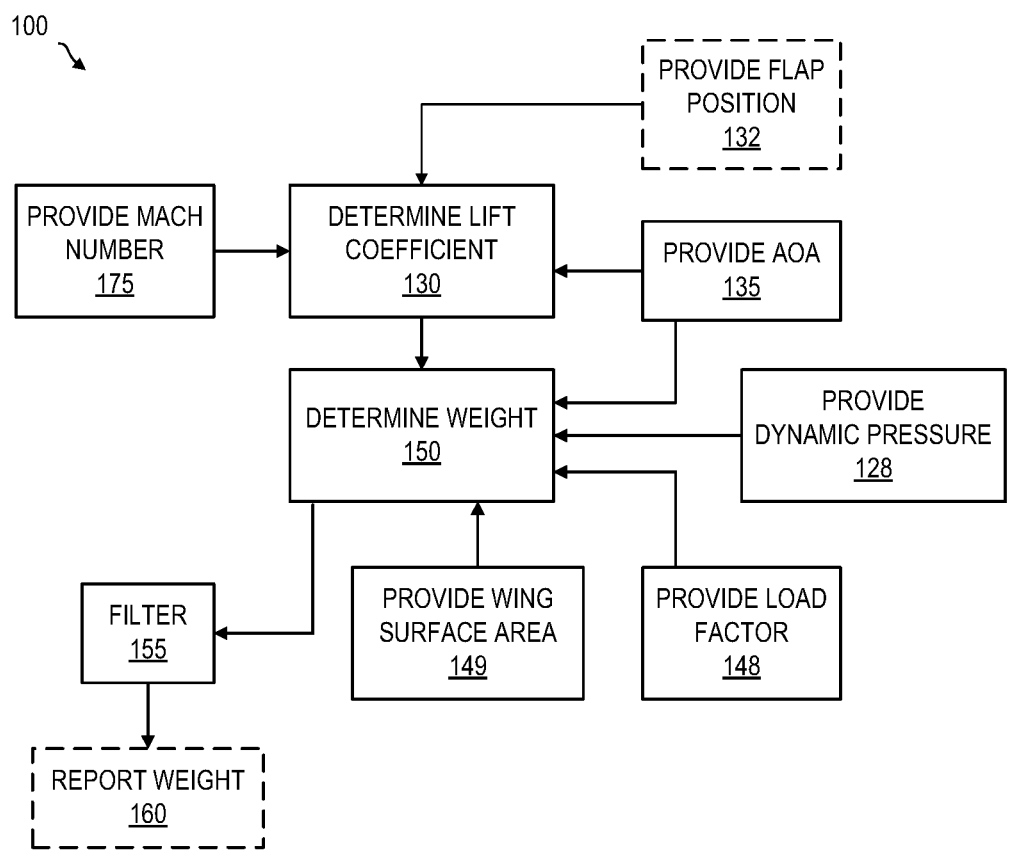
FIG. 1 is a block diagram of a method for aircraft weight estimation based on flight parameters, in an embodiment.
Figure 2:
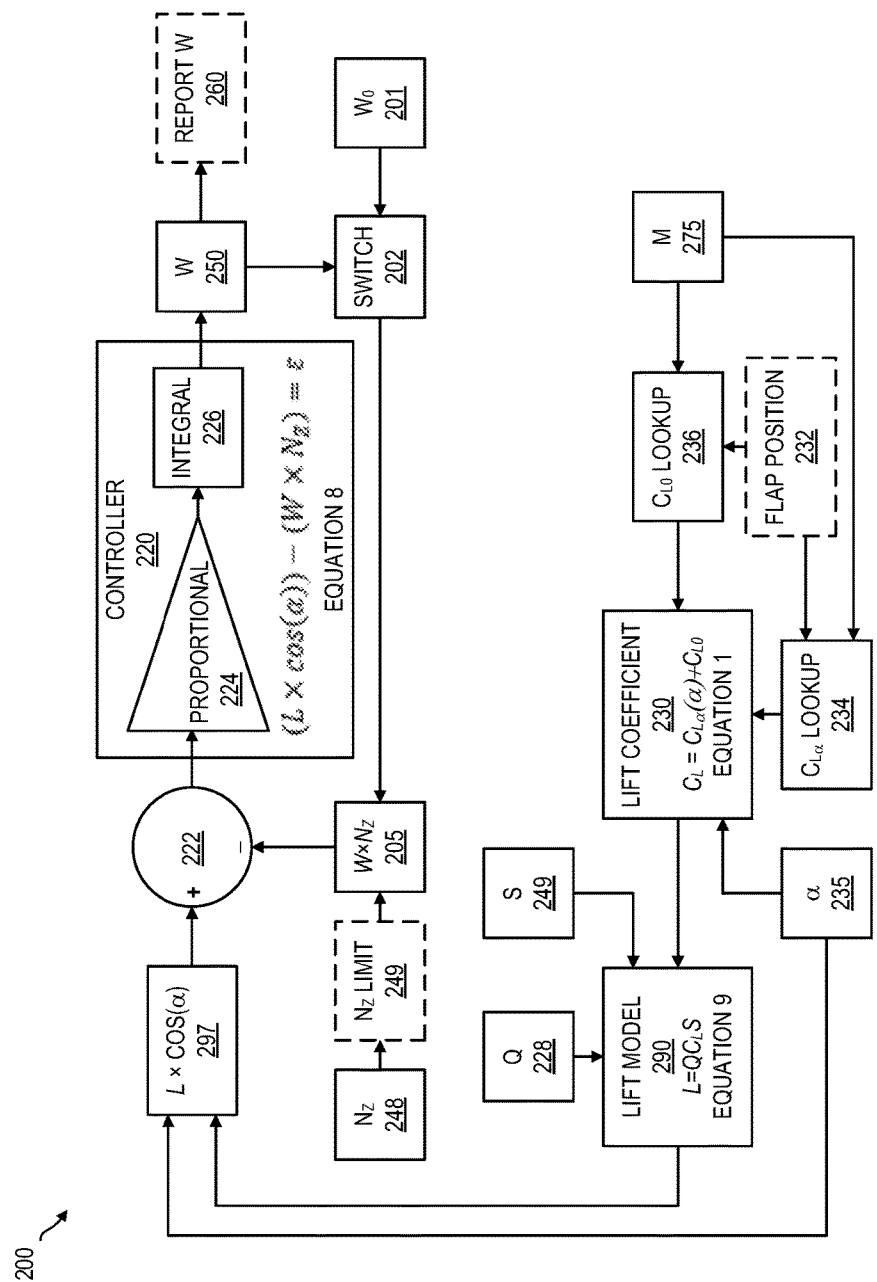
FIG. 2 is a block diagram of an iterative method using a proportional-integral controller for aircraft weight estimation based on a lift model, in an embodiment.
Figure 3:
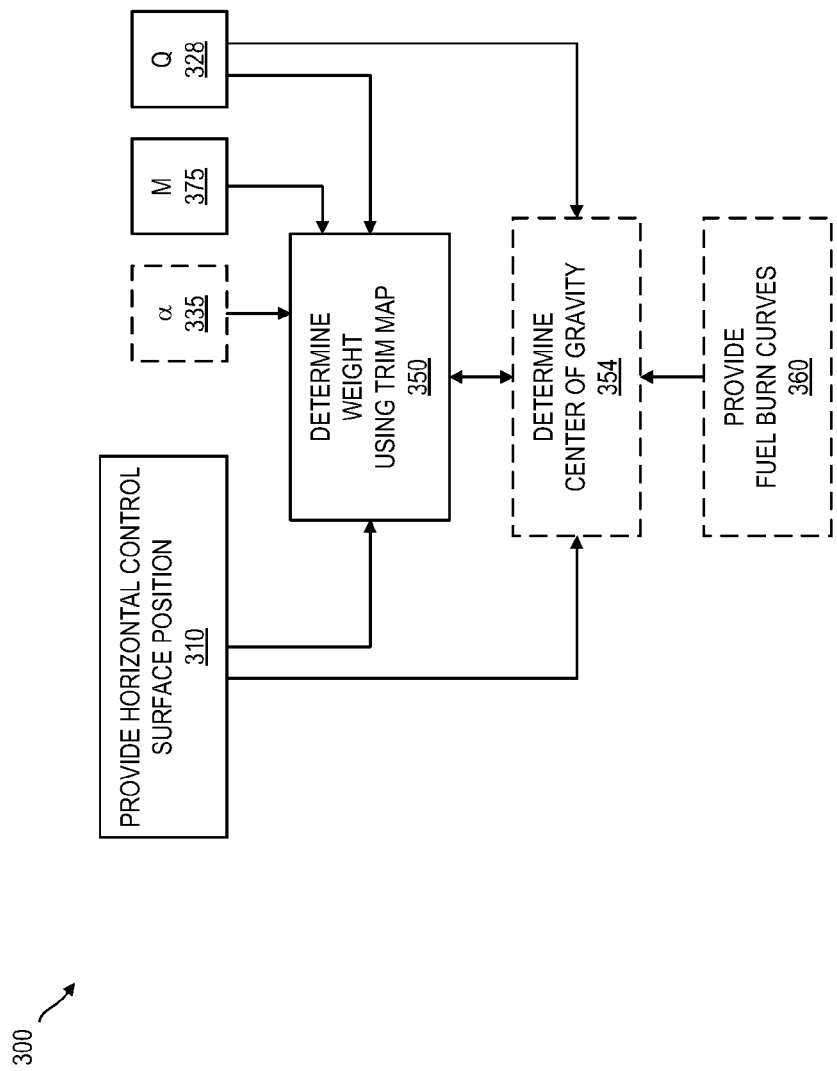
FIG. 3 is a block diagram of a method for aircraft weight estimation based on a horizontal control surface position and a dynamic pressure, in an embodiment.

Embodiments of the present disclosure provide methods 100, 200, and 300 of FIGS. 1, 2, and 3, respectively, for estimating aircraft weight during flight. Aircraft weight decreases during flight due to fuel consumption and deployment of weapons, equipment, aid packages, personnel, etc. Traditionally, weight is estimated by measuring fuel burn and subtracting the weight of the consumed fuel from a known initial weight. Methods 100, 200 and 300, described below, provide alternate and dissimilar means of determining aircraft weight during flight based on flight parameters such as horizontal control surface position and dynamic pressure. The estimated weight values may be reported via a flight computer, as described below, and used for the following exemplary purposes: a) to adjust control law gain scheduling for flight control inputs, b) to use cooperatively with an airspeed estimator for increased airspeed accuracy, and c) as a logic check for comparing to previous weight minus an expected value due to fuel burn.

FIG. 1 is a block diagram of an exemplary method 100 for aircraft weight estimation using flight parameters. Method 100 is for example executed by a flight computer or an air data computer onboard the aircraft, such as air data computer 550, FIG. 5, described below.

In step 130, a lift coefficient is determined using Equation 1:

$$C_L = C_{L_\alpha}\alpha + C_{L_0} \qquad \text{Equation 1}$$

In Equation 1, $C_L$ is the lift coefficient, $\alpha$ is a calibrated aircraft angle of attack (AOA), $C_{L\alpha}$ is a lift coefficient slope of the aircraft, and $C_{L_o}$ is an aircraft lift coefficient for an AOA of zero degrees. The lift coefficient, $C_L$, is a dimensionless coefficient that relates lift generated by a particular aircraft to air density and velocity for a given wing surface area. AOA is the angle between a wing and air flow. The calibrated aircraft AOA, $\alpha$, includes a calibration factor to account for a difference in airflow angle at the wing compared to airflow angle at a vane used to measure AOA. Using Equation 1, $C_L$, is determined from $C_{L_o}$ plus $C_{L\alpha}$ times $\alpha$, provided in step 135. Generally, a larger α will provide more lift, up to a maximum α when the aircraft begins to stall.

Both $C_{L\alpha}$ and $G_{L_o}$ depend from for example airspeed (e.g., Mach number), flap position, and the lifting properties of a particular wing/aircraft and may be determined from lookup tables based on historical flight data (see for example step 230, FIG. 2, described below). Flap position is optionally provided in step 132. Flaps, which typically extend from the trailing edge of a wing, may be extended to different positions, including for example fully retracted, fully extended, and partially extended. Extending aircraft flaps may be used to increase lift, by increasing $C_L$, for takeoff and landing. In an embodiment, leading edge slat position is provided in addition to flap position. Flap position may be measured using flaps indicators 532, FIG. 5, described below.

In an example of step 130, a first lookup table is used to determine, $C_{L\alpha}$, based on airspeed and flap position, and a second lookup table is used to determine, $C_{L_o}$, based on airspeed and flap position. In an embodiment, $C_{L\alpha}$ may be constant, depending on the type of flap.

In step 135, the calibrated AOA, $\alpha$, is provided. In an example of step 135, $\alpha$ is provided by an AOA indicator 535, FIG. 5, which may include an AOA vane or a multi-port probe.

In step 175, the Mach number, M, of the aircraft is provided. In an example of step 175, M is provided by air data computer 550, FIG. 5. Mach number is a nondimensional ratio of air velocity, V, to the speed of sound, α, as shown in Equation 2:

$$M = V/a \qquad \text{Equation 2}$$

In embodiment, air data computer 550 determines M by measuring dynamic pressure, Q, using one or more pitot tubes 542, FIG. 5, to determine airspeed, V, based on air density and Equation 5, below. The speed of sound, α, is determined from Equation 3:

$$\alpha = \sqrt{\gamma RT} \qquad \text{Equation 3}$$

In Equation 3, α is the speed of sound, γ is a ratio of the specific heat at constant pressure to the specific heat at constant volume (γ=1.4 for air), R is the gas constant, and T is a static air temperature. Substituting Equation 3 into Equation 2 provides Equation 4:

$$M = V \sqrt{\frac{1}{\gamma RT}} \qquad \text{Equation 4}$$

V may be determined from dynamic pressure, Q, and air density, ρ, using Equation 5:

$$V = \sqrt{\frac{2Q}{\rho}} \qquad \text{Equation 5}$$

Air density, ρ, may be determined using Equation 6:

$$\rho = \frac{P}{RT} \qquad \text{Equation 6}$$

In Equation 6, P is pressure, R is the gas constant, and T is static air temperature. P is measured using for example a pitot-static port of pitot tubes 542, FIG. 5, described below. Alternatively, P is a standard pressure value provided from a standard lookup table of pressure for a given altitude. Altitude information may be provided by for example a Global Positioning Satellite (GPS) unit 547, FIG. 5, described below. Absolute static air temperature, T, may either be measured at a static port or via a temperature sensing device 545, FIG. 5, described below. Alternatively, T may be estimated from a lookup table of standard static air temperatures for given altitudes.

In step 128, dynamic pressure, Q, is measured using one or more pitot tubes. In an example of step 128, Q is measured using pitot tubes 542, FIG. 5, described below.

In step 148, the aircraft load factor, $N_Z$, is provided, where $N_Z$ is vertical acceleration divided by the gravitational constant. An $N_Z$ indicator 548, FIG. 5 described below, may include an accelerometer to measure $N_Z$ for example.

In step 149, the wing surface area, S, is provided.

In step 150, aircraft weight is determined using Equation 7.

$$W = \frac{\cos(\alpha) Q C_L S}{N_Z} \qquad \text{Equation 7}$$

In Equation 7, cos(α) is the cosine of the calibrated AOA, Q is the dynamic pressure, $C_L$ is the lift coefficient, S is the wing surface area, and $N_Z$ is the aircraft load factor.

Method 100 may be repeated continuously during flight to account for changing flight conditions that affect inputs of method 100 at varying rates and converge on a stable weight signal that varies with time. In order to smooth the weight signal, one or more signal filters may be employed. For example, during aircraft maneuvers, signals of continuously measured values, such as AOA, may vary rapidly causing transient spikes in estimated weight. By filtering the output weight signal, as in step 155 described below, a stable weight signal is determined and reported in step 160. In and embodiment, input signals of measured values may also be filtered, by time averaging for example, to reduce transient spikes.

In step 155, the weight value determined in step 150 is filtered. In an example of step 155, the weight value is filtered via signal filter 555, FIG. 5 to reduce signal noise by for example averaging over time. For example, prior to reporting in step 160, one hundred consecutive weight values may be averaged to produce a time-averaged weight. By repeating method 100 every 0.1 second, one hundred weight values may be averaged and the time-averaged weight may be reported every 10 seconds. Additional signal filtering may be employed via signal filter 555, FIG. 5, such as low-pass filtering, high-pass filtering, band-pass filtering, and notch filtering without departing from the scope hereof In optional step 160, the weight value is reported. In an example of step 160, aircraft weight may be reported to a user via interface 556. Alternatively, aircraft weight is reported to air data computer 550 for subsequent calculations, such as synthetic airspeed determination.

FIG. 2 is a block diagram of an exemplary method 200 for weight estimation for aircraft based on a lift model. Method 200 is for example a control algorithm executed by an air data computer onboard the aircraft, such as air data computer 550, FIG. 5, which provides a proportional-integral controller 220, described below. Method 200 estimates aircraft weight by modeling aircraft lift, in step 290, and balancing the lift force against an initial weight to determine an updated weight using controller 220, and iteratively repeating these steps to converge to a stable weight value.

In step 201, an initial weight is provided. The initial weight may be estimated from a known empty weight of the aircraft plus an estimated weight of cargo, fuel, passengers, etc.

In step 202, a switch determines which weight value to provide. During a first iteration of method 200, step 202 uses the initial weight provided in step 201. During subsequent iterations, step 202 switches to an updated weight from step 250, which is output from controller 220, described below.

In step 248, the aircraft load factor, $N_Z$, is provided, where $N_Z$ is vertical acceleration divided by the gravitational constant. Step 248 is an example of step 148 FIG. 1.

In an optional step 249, $N_Z$ is limited between a maximum value and a minimum value. An example maximum $N_Z$ value is 1.5 and an example minimum $N_Z$ value is 0.9. In an embodiment, $N_Z$ limits are coordinated with AOA values due to non-linear effects at high AOA. In another embodiment, the gain provided in integral term 226 is set to zero when $N_Z$ is on the minimum or maximum limit.

In step 205, the product of $W \times N_Z$ is determined, which provides an effective weight that accounts for vertical acceleration and deceleration. The effective weight, $W \times N_Z$, is provided to step 222.

In step 222, a difference is calculated between an effective lift, $L \times \cos(\alpha)$, from step 297 described below, and effective weight, $W \times N_Z$, from step 205. If any difference exists between effective lift and effective weight during flight, this difference is accounted for with an error value, ε, as shown in Equation 8.

$$(L \times \cos(\alpha)) - (W \times N_z) = \varepsilon \quad \text{Equation 8}$$

In Equation 8, L is the lift force exerted on the aircraft during flight. In controller 220, the error value, ε, is minimized in a first iteration of method 200 by updating weight, W.

In step 250, updated aircraft weight is provided. In an example of step 250, updated aircraft weight is provided for a next iteration of method 200, specifically to determine effective weight, $W \times N_Z$, in step 205 via switch 202. Updated weight is optionally reported in step 260, which is an example of step 160, FIG. 1. During subsequent iterations of method 200, weight, W, output in step 250 is updated by controller 220 to further minimize the error value, ε, to below a predetermined threshold. The predetermined threshold is one hundred pounds for example.

Controller 220 may include a feedback loop having a weighted sum of a proportional term 224 and an integral term 226, such that proportional term 224 adjusts W in proportion to the magnitude of ε, and integral term 226 adjusts W in proportion to both the magnitude and the duration of ε by integrating over time. The terms are weighted based on gains (e.g., coefficients), which may be tuned to provide a stable W value with a minimal ε. The proportional gain may be used to set a time constant of the feedback loop. In an embodiment, the integral gain provided in integral term 226 is set to zero when $N_Z$, provided in step 249, is on the minimum or maximum limit. Controller 220 may be analog or digital without departing from the scope hereof Controller 520, FIG. 5 described below, is an example of a digital controller with instructions provided by software 555 of air data computer 550.

In step 290, lift, L, is determined using Equation 9:

$$L = Q C_L S \quad \text{Equation 9}$$

In Equation 9, Q is the dynamic pressure provided in step 228, $C_L$ is the lift coefficient provided in step 230, and S is the wing surface area provided in step 249, which are described below.

In step 297, the product of $L \times \cos(\alpha)$ is determined to provide effective lift.

In step 228, dynamic pressure, Q, is measured using one or more pitot tubes. Step 228 is an example of step 128, FIG. 1.

In step 230, which is an example of step 130, FIG. 1, provides lift coefficient, $C_L$, using Equation 1. As described above for step 130, both $C_{L\alpha}$ and $C_{Lo}$ depend from for example airspeed (e.g., Mach number), flap position, and the lifting properties of a particular wing/aircraft and may be determined from lookup tables based on historical flight data. Mach number, M, is determined in step 275, described below.

In step 235, the calibrated AOA, α, is provided. Step 235 is an example of step 135, FIG. 1.

In optional step 232, flap position is provided. Step 232 is an example of step 132, FIG. 1, which may also include providing position of leading edge slats without departing from the scope hereof.

In step 234, a first lookup table is used to determine, $C_{L\alpha}$, based on airspeed and optionally flap position. An example of the first lookup table is $C_{L\alpha}$ lookup table 534, FIG. 5, described below. In an embodiment, $C_{L\alpha}$ is constant for a certain flap type.

In step 236, a second lookup table is used to determine, $C_{Lo}$, based on airspeed and optionally flap position. An example of the second lookup table is $C_{Lo}$, lookup table 536, FIG. 5, described below.

In step 275, Mach number, M, is provided. Step 275 is an example of step 175, FIG. 1. In an example of step 275, M is determined from Equation 4 and provided to steps 234 and 236, described above.

Method 200 may be iteratively repeated to minimize ε by updating W, thereby continuously providing an accurate and stable value for aircraft weight as aircraft and atmosphere parameters change during flight.

FIG. 3 is a block diagram of an exemplary method 300 for aircraft weight estimation based on a horizontal control surface position. Specifically, method 300 uses a "trim map" of historical flight data that provides horizontal control surface angles versus dynamic pressure values for a range of aircraft weights. Method 300 is for example executed by an air data computer onboard the aircraft, such as air data computer 550, FIG. 5 for example.

Figure 4:
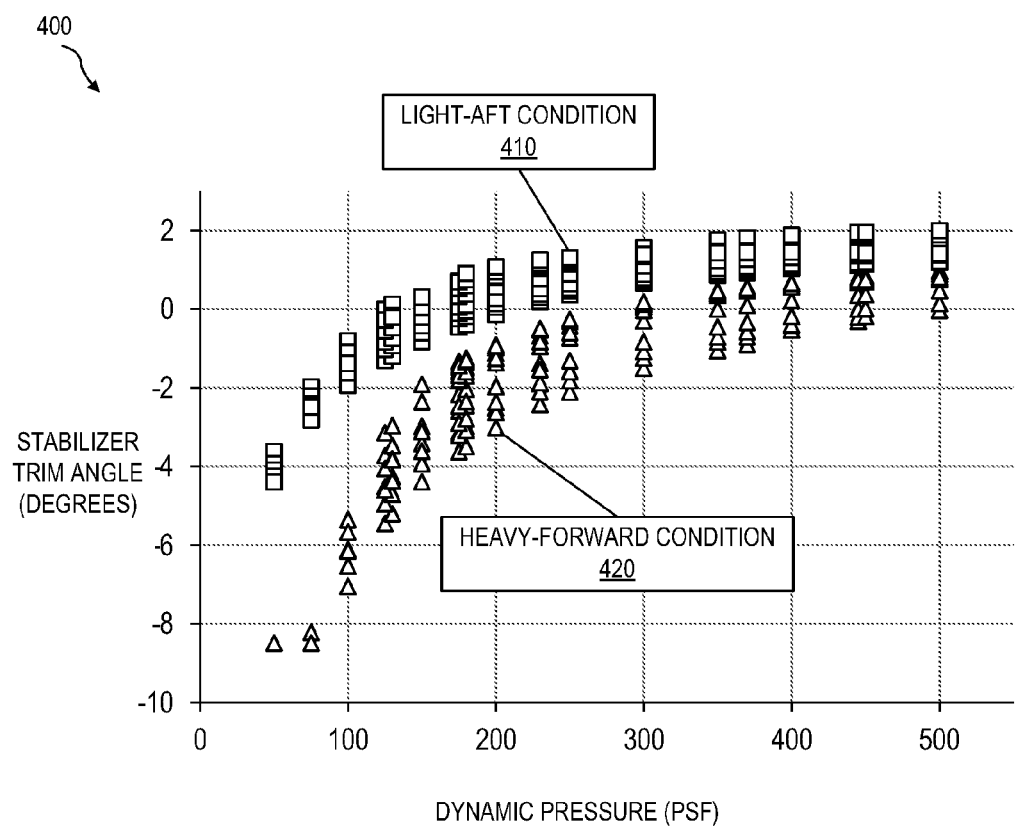
FIG. 4 illustrates stabilizer trim angles versus dynamic pressure for a range of aircraft weights for an aircraft with all flaps fully retracted, in an embodiment.

In step 310, a horizontal control surface position is provided. In an example of step 310, a control surface sensor 510, FIG. 5 provides position information using one or more sensors located in the horizontal control surface. A horizontal control surface may include a horizontal stabilizer and an elevator without departing from the scope hereof. FIG. 4 illustrates exemplary horizontal stabilizer trim angles versus dynamic pressure for a range of weights and center of gravity positions.

In step 328, dynamic pressure, Q, is provided. Step 328 is an example of step 128, FIG. 1. Q may be measured using one or more pitot tubes 542 for example. Optionally, Q may be updated based on a static pressure and M In optional step 335, the calibrated AOA, α, is provided. Step 335 is an example of steps 135 and 235, FIGS. 1 and 2, respectively.

In step 375, Mach number, M, is provided. Step 375 is an example of steps 175 and 275, FIGS. 1 and 2, respectively.

In step 350, weight, W, is determined from a trim map of horizontal control surface position versus dynamic pressure, Q. The trim map is a series of curves from historical flight data relating Q with horizontal control surface position, such as a horizontal stabilizer angle for example, as a function of Mach number, M, and optionally the calibrated AOA, α. The trim map may optionally include horizontal control surface position as a function of $C_G$. FIG. 4, described below, shows an exemplary plot of horizontal stabilizer angle versus dynamic pressure values for a range of aircraft weight and $C_G$ positions.

In optional step 354, the aircraft center of gravity ($C_G$) is determined using fuel burn curves provided in optional step 360. The fuel burn curves include plots relating weight and $C_G$ with decreasing fuel during flight based on historical flight data relating $C_G$ with weight for a given configuration (e.g., flap position and amounts of fuel, passengers and cargo onboard). In an embodiment, if a signal providing dynamic pressure, Q is lost due to malfunctioning pitot tubes for example, W may be estimated from the last known W based on the fuel burn curve and a fuel measurement.

Method 300 is repeated continuously during flight to determine weight as flight conditions change, for example as aircraft weight decreases during flight. Method 300 may be used cooperatively with an airspeed estimator, which depends on W. By providing a more accurate W using method 300, a more accurate airspeed estimate, V, may be determined from the airspeed estimator in the absence of a measured airspeed. In an embodiment, real-time $C_G$ may be determined from W and horizontal control surface angle and used to modify resistance of pilot controls for example.

FIG. 4 shows a trim map 400 with exemplary horizontal stabilizer angles plotted versus dynamic pressure for a range of aircraft weight and $C_G$ combinations for an exemplary aircraft with all flaps fully retracted. The aircraft $C_G$ may be determined based on fuel burn curves as a function of weight, as in step 354 of method 300 for example. Each data point plotted in FIG. 4 represents a weight and $C_G$ combination for a particular dynamic pressure in pounds per square foot (psf) and corresponding stabilizer trim angle in degrees.

The values plotted in trim map 400 may be grouped into two weight and $C_G$ conditions that bound potential stabilizer trim angles: 1) a light-aft condition 410, shown with squares, and 2) a heavy-forward condition 420, shown with triangles. For conditions 410, 420, the terms light and heavy refer to aircraft weight, while the terms aft and forward refer to $C_G$ position. Thus, light-aft condition 410 shows possible ranges of stabilizer angles for an aircraft flying in a light-weight mode, for example without passengers and cargo and with little fuel remaining. In the light-weight mode, the $C_G$ is in an aft position compared to heavier flight conditions. Heavy-forward condition 420 shows possible ranges of stabilizer angles for aircraft flying in a heavy-weight mode with a forward $C_G$ position, for example fully fueled with a maximum weight of passengers and cargo. Other dynamic pressures and stabilizer trim angles are of course possible, for example due to different flap positions.

Figure 5:
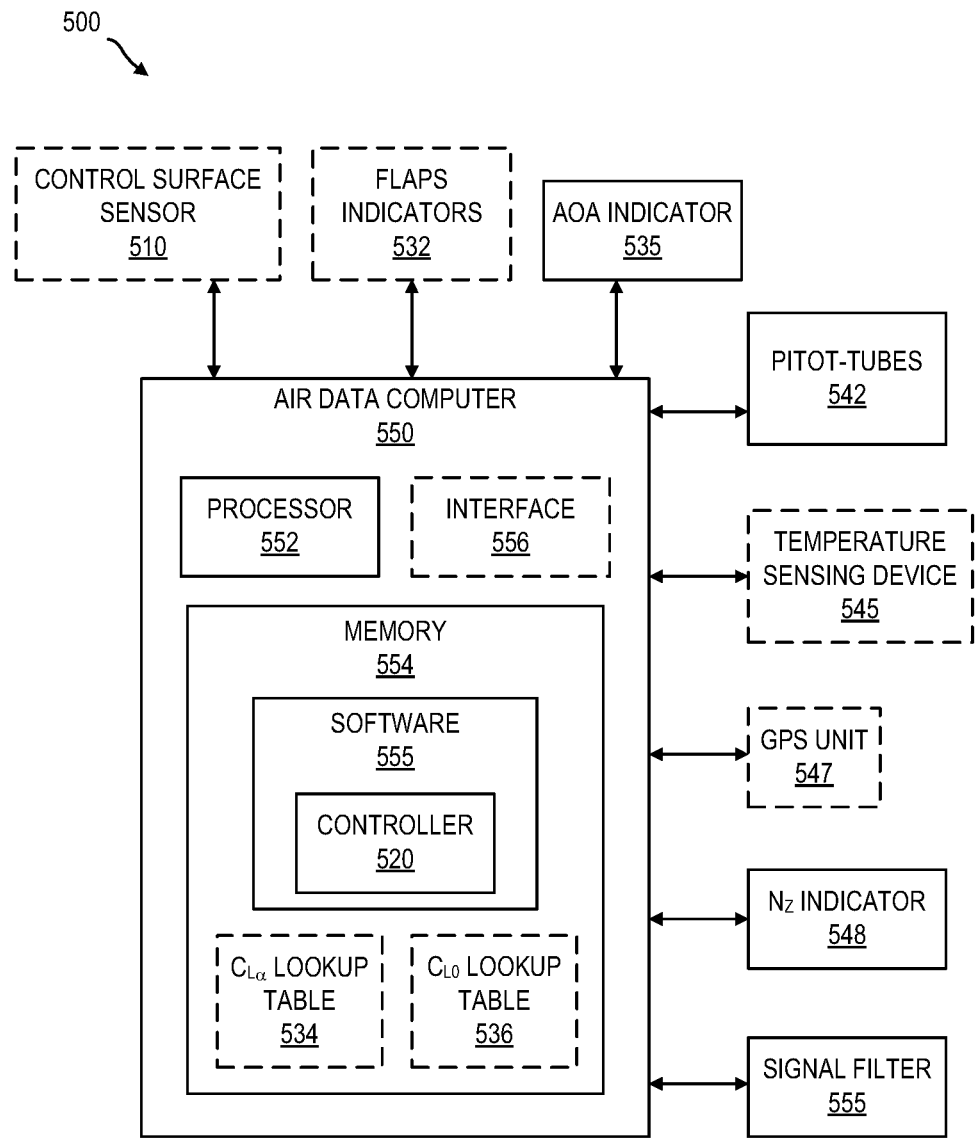
FIG. 5 shows a block diagram of an air data computer and communications architecture for estimating aircraft weight, in an embodiment.

FIG. 5 shows a block diagram of an exemplary air data computer and communications architecture 500. Architecture 500 includes an air data computer 550, which is for example a computer onboard the aircraft having a memory 554, including a non-transitory medium for storing software 555, and a processor 552 for executing instructions of software 555. Air data computer 550 may further include an optional interface 556 for a pilot or co-pilot to transmit instructions and receive information. Communication between air data computer 550 and subsystems, shown in FIG. 5 and described below, may be by one of a wired and/or wireless communication media.

Control surface sensor 510 may include one or more sensors configured to detect a position of a horizontal control surface for transmitting to air data computer 550. Example horizontal control surfaces include a horizontal stabilizer and an elevator. Control surface sensor 510 provides position information in for example step 310, FIG. 3.

Controller 520 may be part of software 555 incorporated directly within air data computer 550. Alternatively, controller 520 may include a microcontroller, microprocessor, or programmable logic controller (PLC) in communication with, but separate from, air data computer 550, without departing from the scope hereof. Controller 520 may include a feedback mechanism for providing stable values from iterative numerical calculations, such as proportional-integral controller 220, FIG. 2.

Flaps indicators 532 may include sensors located in the flaps of the aircraft wings for providing flap position information. For example, flap position indicators 532 provide flap position information in steps 132 and 232 of FIGS. 1 and 2, respectively. Flaps are an example of a control surface that typically extend from the trailing edge of a wing and may be extended to different positions, including for example fully retracted, fully extended, and partially extended. Extending aircraft flaps may be used to increase lift, by increasing $C_L$, for takeoff and landing. Flap position indicators 532 may also include indicators of leading edge slat position without departing from the scope hereof.

$C_{L\alpha}$ lookup table 534 is used to determine $C_{L\alpha}$, based on airspeed and flap position and used for example in step 234, FIG. 2. Similarly, $C_{L\alpha}$ lookup table 536 is used to determine $C_{L\alpha}$ based on airspeed and flap position and used for example in step 236, FIG. 2. $C_{L\alpha}$ and $C_{Lo}$ are used to determine the lift coefficient, $C_L$, as shown in Equation 1, above. Both $C_{L\alpha}$ and $C_{Lo}$ depend from for example airspeed (e.g., Mach number), flap position, and the lifting properties of a particular wing/aircraft. Lookup tables 534, 536, which are stored in memory 554, may be based on historical flight data and may also be used in step 130, FIG. 1 for example.

Angle of attack (AOA) indicator 535 is provided to indicate the aircraft's calibrated AOA, α, which is used to determine the lift coefficient, $C_L$, as shown in Equation 1, for example. AOA indicator 535 is for example an AOA vane or a multi-port probe used to provide AOA information in steps 135 and 235, FIGS. 1 and 2, respectively.

Pitot tubes 542 may include one or more forward facing pitot tubes and one or more static ports. A forward facing pitot tube is for example a tube with a forward facing port. As the aircraft moves forward, air rams into the port generating pressure in the pitot tube known as pitot pressure. An increase in the aircraft's airspeed causes a corresponding increase in the pitot pressure. The static port measures static pressure, which is dependent on the aircraft's altitude. The static port is located for example on a side of an aircraft's fuselage, facing tangent to the forward direction, and therefore not exposed to pitot pressure. The aircraft's airspeed may be determined by air data computer 550 based on data from forward facing pitot tubes and static ports of pitot tubes 542. Dynamic pressure, Q, is determined in for example steps 128, 228 and 328, FIGS. 1, 2 and 3, respectively, based on pitot pressure and static pressure of pitot tubes 542.

Temperature sensing device 545 may include one or more of a thermometer, a thermocouple and/or a resistance temperature detector for determining temperature.

GPS unit 547 may provide aircraft position information based on the Global Positioning Satellite (GPS) system. GPS unit 547 may include a transceiver configured to determine three-dimensional position by transmitting signals to, and receiving signals from, a network of four or more Earth orbiting satellites. GPS unit 547 may be used to provide altitude information.

Load factor ($N_Z$) indicator 548 may indicate vertical acceleration divided by the gravitational constant. $N_Z$ indicator 548 includes one or more accelerometers for example. Steps 148 and 248, FIGS. 1 and 3, respectively, receive $N_Z$ information from for example $N_Z$ indicator.

Signal filter 555 provides smooth signals without transient spikes. For example, as method 100 is repeated during flight to account for changing flight conditions, inputs of method 100 may be filtered using signal filter 555. For example, during aircraft maneuvers, signals of continuously measured values, such as AOA, may vary rapidly causing transient spikes in estimated weight. By filtering input signals of measured values, by time averaging for example, transient spikes are reduced. Similarly, the output weight signal is filtered using signal filter 555. Signal filter 555 may include electronic circuit filters and/or digital filters to provide one or more of low-pass filtering, high-pass filtering, band-pass filtering, notch filtering and time averaging without departing from the scope hereof Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A method for aircraft weight estimation, comprising:
   providing a dynamic pressure signal from a pitot-static subsystem;
   determining a calibrated angle of attack signal from an angle of attack indicator;
   determining a lift coefficient signal based on the calibrated angle of attack signal and a Mach number;
   providing a load factor signal from an accelerometer; and
   determining a weight signal based on the dynamic pressure signal, the calibrated angle of attack signal, the lift coefficient signal, the load factor signal, and a wing surface area.

2. The method of claim 1, wherein determining the lift coefficient is further based on a flap position.

3. The method of claim 1, further comprising determining a time-averaged weight signal by averaging the weight signal over time.

4. The method of claim 1, further comprising updating the lift coefficient based on one or more lookup tables.

5. A method for aircraft weight estimation, comprising:
   measuring a horizontal control surface position with a sensor;
   providing a dynamic pressure from a pitot-static subsystem;
   determining a weight using historical flight data relating the horizontal control surface position to the dynamic pressure based on aircraft weight; and
   repeating continuously during flight the steps of measuring the horizontal control surface position, providing the dynamic pressure, and determining the weight to provide a weight signal.

6. The method of claim 5, further comprising filtering the weight signal by averaging the weight over time.

7. The method of claim 5, further comprising determining an airspeed based on the dynamic pressure signal.

8. The method of claim 7, further comprising determining a Mach number based on the airspeed and a temperature measured with a temperature sensing device.

9. The method of claim 8, further comprising updating the weight based on the Mach number and an air density measured using the pitot-static subsystem.

10. The method of claim 9, further comprising determining a center of gravity based on the weight signal and an amount of fuel onboard the aircraft.

11. The method of claim 10, further comprising updating the weight signal based on the center of gravity.

12. A system for continuously estimating aircraft weight during flight, comprising:
    a pitot-static subsystem for providing a dynamic pressure signal;
    an angle of attack indicator for providing a calibrated angle of attack signal;
    an accelerometer for providing a load factor signal;
    a controller configured to provide a weight signal based on an initial weight, the dynamic pressure signal, the calibrated angle of attack signal, and the load factor signal; and
    a signal filter for filtering the weight signal to determine a stable aircraft weight.

13. The system of claim 12, further comprising a flap indicator to sense a flap position for updating the lift coefficient.

14. The system of claim 12, further comprising a lift-coefficient-slope lookup table for determining the lift coefficient based on the calibrated angle of attack signal.

15. The system of claim 12, further comprising an airspeed indicator for providing airspeed based on the dynamic pressure signal.

16. The system of claim 15, further comprising a zero-degree angle-of-attack lift coefficient lookup table for determining the lift coefficient based on airspeed.

17. The system of claim 12, further comprising a control surface sensor for sensing a control surface position and a trim table based on historical flight data relating the control surface position to the dynamic pressure signal for a range of weights.

* * * * *